United States Patent
Cho et al.

(10) Patent No.: US 7,324,903 B2
(45) Date of Patent: Jan. 29, 2008

(54) METHOD AND APPARATUS FOR MEASURING SIGNAL QUALITY USING EYE PATTERN

(75) Inventors: Eing-seob Cho, Yongin-si (KR); Jae-song Shim, Seoul (KR); Hyun-soo Park, Seoul (KR); Jae-wook Lee, Osan-si (KR); Jung-hyun Lee, Seoul (KR); Eun-jin Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 10/919,531

(22) Filed: Aug. 17, 2004

(65) Prior Publication Data

US 2005/0078188 A1 Apr. 14, 2005

(30) Foreign Application Priority Data

Oct. 10, 2003 (KR) ............... 10-2003-0070748

(51) Int. Cl.
*G01R 13/00* (2006.01)
*G06F 11/30* (2006.01)

(52) U.S. Cl. .............. 702/69; 702/67; 702/180; 702/182; 702/189; 348/180; 348/192; 398/202; 398/33; 375/224; 375/226

(58) Field of Classification Search ........... 702/69, 702/125, 179–182, 81, 176; 348/192, 180; 398/25–28; 356/73.1
See application file for complete search history.

(56) References Cited

U.S. PATENT DOCUMENTS 4,034,340 A * 7/1977 Sant'Agostino ............. 714/705

| | | | |
|---|---|---|---|
| 6,396,601 B1 * | 5/2002 | Takara et al. ............ | 398/9 |
| 6,718,138 B1 * | 4/2004 | Sugawara ............... | 398/9 |
| 7,174,279 B2 * | 2/2007 | Conner ................. | 702/189 |
| 2002/0167693 A1 * | 11/2002 | Vrazel et al. ............ | 359/109 |
| 2002/0196510 A1 * | 12/2002 | Hietala et al. ........... | 359/189 |
| 2003/0016605 A1 * | 1/2003 | Tateyama et al. ......... | 369/47.26 |
| 2003/0117613 A1 * | 6/2003 | Audouin et al. .......... | 356/73.1 |
| 2005/0117916 A1 * | 6/2005 | Kropp et al. ............ | 398/202 |

FOREIGN PATENT DOCUMENTS

| JP | 09-288011 | 11/1997 |
|---|---|---|
| JP | 10-010176 | 1/1998 |
| JP | 10-233811 | 9/1998 |
| JP | 10-322401 | 12/1998 |
| JP | 2000-358015 | 12/2000 |

* cited by examiner

*Primary Examiner*—Hal Wachsman
*Assistant Examiner*—Janet Suglo
(74) *Attorney, Agent, or Firm*—Stein, McEwen & Bui, LLP

(57) ABSTRACT

A signal quality measuring method and apparatus in which a quality of a signal detected from an RF signal read out from a disk or a communications channel is measured by using eye pattern signals of the detected RF signals. Eye pattern signals representing time change of a waveform of the detected signal are generated and a signal quality value is generated based on an eye depth and/or an eye width measured from the eye pattern signals. A histogram of the eye pattern signals is used to identify a plurality of main level values which are used as a reference value in measuring the signal quality. Accordingly, signal characteristics in a high-density storage medium system or communication system may be accurately represented.

23 Claims, 9 Drawing Sheets

METHOD AND APPARATUS FOR MEASURING SIGNAL QUALITY USING EYE PATTERN

CROSS-REFERENCE TO RELATED APPLICATIONS

This application claims the benefit of Korean Patent Application No. 2003-70748, filed on Oct. 10, 2003, in the Korean Intellectual Property Office, the disclosure of which is incorporated herein by reference.

BACKGROUND OF THE INVENTION

1. Field of the Invention

The present invention relates to an apparatus for and a method of measuring signal quality, and more particularly, to an apparatus for and a method of measuring signal quality in which the quality of an output signal detected from an RF signal read out from a disk is measured by using signals useable for generating an eye pattern of the output signal.

2. Description of the Related Art

In a system such as a storage medium system or a communication system, when an input signal passes through a channel and is output as an output signal, if external noise is added during channel-transmitting and receiving processes, the output signal passing through the channel has an undesired component and a waveform of the output signal is deformed, causing errors in a process for extracting information from the output signal.

In a conventional signal detection system, signal quality is determined by detecting a jitter value from a received output signal. The jitter value, which represents a percentage variation of the received signal with reference to time, has been widely used to measure signal quality in the storage medium system.

In addition, since a large amount of data is intended to be stored in a physical storage area in a current storage medium system and to be transmitted through a narrow transmission band in a current communication system, a complicated processing algorithm in such an adaptive equalizer and a Viterbi detector has been used for the data detection process rather that a conventional signal processing method using a simple signal polarity detection process.

However, when the conventional method using the jitter value as a criterion for determining signal quality is used in a system performing a complicated signal processing algorithm, the signal quality is not accurately determined because a bit error rate and a detected jitter value have different characteristics.

FIG. 1 is a view illustrating a bit error rate measured in a storage medium system. For this measurement, data were recorded on a 12-cm blu-ray disk with a recording density of 31 gigabytes (GB), and then, so-called "radial and tangential tilts" were added as external noises. After that, the reproducing bit error rate and jitter value were measured. Referring to FIG. 1, a lowest bit error rate was obtained at tilt 0 corresponding to no external noise. As the tilt is increased, the bit error rate increased. In FIG. 1, the expressions for bit error rate, 1.E+00, 1.E−01, 1.E−02 . . . 1.E−06, correspond to $1 \times 10^N$, where N is 0,−1,−2 . . . −6, respectively.

FIG. 2 is a view illustrating signal quality results obtained by jitter value detection using the same conditions as were used for obtaining the data of FIG. 1. In FIG. 2, a lowest jitter value was obtained at tilt 0, and as the tilt increased, the jitter value increased, similar to the increase in bit error rate shown in FIG. 1. However, at tilts +0.4 and −0.4, the jitter values change differently from the change in bit error rates shown in FIG. 1. Furthermore, at tangential tilts of −0.6 or less and +0.6 or more and at radial tilts of +0.6 or more, the jitter value was not detectable. In other words, the conventional signal quality estimating method using the jitter value does not accurately represent the signal quality in the signal processing method of the high-density storage medium system.

In addition, in the conventional signal quality estimating method using the jitter value measurement, an original signal pattern must be known to measure the quality of output signals.

SUMMARY OF THE INVENTION

The present invention provides a method of measuring signal quality and an apparatus for accurately representing signal characteristics in a high-density storage medium system or a communication system.

According to an aspect of the present invention, there is provided an apparatus for measuring the quality of a signal passing through a channel, the apparatus comprising: an eye pattern detection unit, which detects eye pattern signals of the signal passing through the channel; and a signal quality generation unit, which generates a signal quality of the signal passing through the channel based on an eye depth obtained from the eye pattern signals.

The signal quality generation unit may comprise: a histogram generation unit, which receives the eye pattern signals and generates a histogram of the eye pattern signals; a level section determination unit, which receives the histogram and determines a size of each of a plurality of level sections and a corresponding main level value; and an eye depth generation unit, which generates the eye depth of the eye pattern signals for each determined level section.

The histogram generation unit may divide the eye pattern signals into unit sections having a predetermined size and count a number of the signals belonging to each unit section.

The level section determination unit may extract unit sections having a maximum or minimum number of the eye pattern signals and determine a section bordered by unit sections having minimum-maximum-minimum number of signals as one level section.

The eye depth generation unit may generate the eye depth based on levels and distribution states of the eye pattern signals belonging to the level sections.

The distribution states may be generated based on the main level values of the level sections, and each main level value may be one of an average value of the levels of the eye pattern signals in the corresponding level section, a level value of a unit section having a highest number of the eye pattern signals among the signals belonging to the corresponding level section, or a value input by a user.

The distribution states may be represented as statistical variance values, which are calculated with reference to the main level values or generated based on differences between the main level values and the levels of the signals belonging to the corresponding level section.

According to another aspect of the present invention, there is provided an apparatus for measuring the quality of a signal passing through a channel, the apparatus comprising: an eye pattern detection unit, which detects eye pattern signals of the signal passing through the channel; and a signal quality generation unit, which generates the signal quality based on an eye width measured from the eye pattern signals.

The signal quality generation unit may comprise: a crossing point detection unit, which receives the eye pattern signals and a main level value and detects crossing points of the main level value at a sampling time transition; a delta generation unit, which generates delta values from the crossing points; and an eye width generation unit, which generates an eye width from the delta values, wherein the delta values represent time transition periods at the time of the crossing points intersecting the corresponding levels.

The crossing point detection unit may extract sampling times t and (t+1) and signal levels $Y_t$ and $Y_{t+1}$ from crossing points P1 and P2 in the eye pattern signals.

The delta detection unit may determine the delta values based on distances between the crossing points and the sampling time, and particularly, the delta detection unit may generate the delta value by using an equation delta=$L_1/L_2$= $(Y_i-Y_t)/(Y_{t+1}-Y_t)$, wherein $Y_i$ is a main level value of the i-th level section and $Y_t$, and $Y_{t+1}$ are levels of the eye pattern signals of the crossing points at times t and t+1, respectively.

The eye width generation unit may generate signal quality based on an average value and a variance value of the delta values, and more specifically, the eye width generation unit may generate a signal quality ($Q_{w2}$) by using an equation $$Q_{w2} = 1 - 0.5 \sum_{i=0}^{N-1} (Mt_i + 0.5vt_i),$$

($Mt_i$+0.5$vt_i$), wherein $Mt_i$ and $vt_i$ are an average value and a variance value of the i-th level section, respectively.

According to another aspect of the present invention, there is provided an apparatus for measuring signal quality in a system in which an input signal passes through a channel and is output as the output signal, the apparatus comprising: an eye pattern detection unit, which detects eye pattern signals of the output signal; a first signal quality generation unit, which generates an eye depth signal quality ($Q_d$) based on an eye depth measured from the eye pattern signals; a second signal quality generation unit, which generates an eye width signal quality ($Q_w$) based on an eye width measured from the eye pattern signals; and a total signal quality generation unit, which generates a total signal quality ($Q_T$) based on the eye depth signal quality and the eye width signal quality.

The first signal quality generation unit may comprise: a histogram generation unit, which receives the eye pattern signals and generates a histogram of the output signal; a level section determination unit, which receives the histogram of the output signal and determines a size of each of a plurality of level sections to include a corresponding main level value; and an eye depth generation unit, which generates the eye depth of the eye pattern signals for each determined level section; and the second signal quality generation unit may comprise: a crossing point detection unit, which receives the eye pattern signals and the main level value and detects crossing points of the main level value at a sampling time transition; a delta generation unit, which generates delta values from crossing points; and an eye width generation unit, which generates an eye width from the delta values, wherein the delta values represent time transition periods at a time of the crossing points intersecting the corresponding levels.

The main level value may be received from the first signal quality generation unit.

The total signal quality generation unit may generate the total signal quality by using one of the following equations:

$$Q_T = \left(\sum_{i=0}^{N-1} D_i\right) \times \left(\sum_{i=0}^{N-1} W_i\right) = Q_d \times Q_w,$$

$$Q_T = \sum_{i=0}^{N-1} (D_i \times W_i), \text{ and}$$

$$Q_T = \sum_{i=0}^{N-2} \{0.5(W_i + W_{i+1}) \times D_i\},$$

wherein $Q_d$ and $Q_w$ are the first and second signal qualities, respectively.

According to another aspect of the present invention, there is provided a method of measuring the quality of a signal passing through a channel, the method comprising: detecting eye pattern signals of the signal passing through the channel; and generating the signal quality based on an eye depth measured from the eye pattern signals.

According to another aspect of the present invention, there is provided a method of measuring the quality of a signal passing through a channel, the method comprising: detecting eye pattern signals of the signal passing through the channel; and generating the signal quality based on an eye width measured from the eye pattern signals.

According to another aspect of the present invention, there is provided a method of measuring the quality of a signal passing through a channel, the method comprising: detecting eye pattern signals of the signal passing through the channel; generating an eye depth signal quality ($Q_d$) based on an eye depth measured from the eye pattern signals; generating an eye width signal quality ($Q_w$) based on an eye width measured from the eye pattern signals; and generating a total signal quality ($Q_T$) based on the eye depth signal quality and the eye width signal quality.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
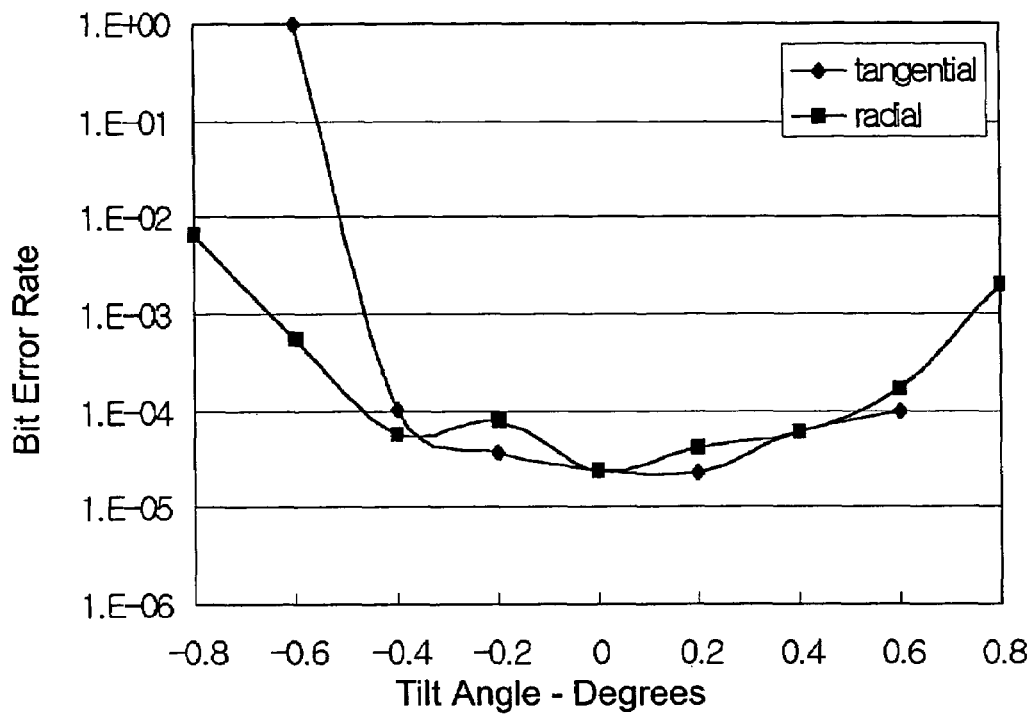
FIG. 1 is a view illustrating measured bit error rates of a storage medium system.

Reference will now be made in detail to the embodiments of the present invention, examples of which are illustrated in the accompanying drawings, wherein like reference numerals refer to the like elements throughout. The embodiments are described below to explain the present invention by referring to the figures.

An "eye pattern" denotes a change of a waveform of a specific time-dependent signal. In order to obtain an eye pattern, the time axis in an oscilloscope is triggered in synchronization with a bit rate and shifted by a time slot interval. Then, consecutive waveforms for the respective bits are overlapped on the screen of the oscilloscope. In general, the figure displayed on the screen has an opening on its center, which is called an "eye pattern." The eye pattern of an ideal signal has no "eye" shape but only upper and lower horizontal lines. However, the eye pattern of a general signal subjected to inter-symbol interferences and noises has the "eye" shape. The band restrictions and noise amounts of a system may be qualitatively obtained by analyzing the "eye" shape. The purpose of signal quality measurement in the storage medium system is to measure an output signal read out from the storage medium or an input signal of a PRML system such as a Viterbi detector. Hereinafter, a signal of which quality is measured is referred to as a "measured signal." Unless the context indicates otherwise, generating an eye pattern means generating sample data signals which are useable for displaying an eye pattern and generating eye pattern signals refers to acquiring such sample data signals by sampling an input signal at predetermined times.

Figure 3:
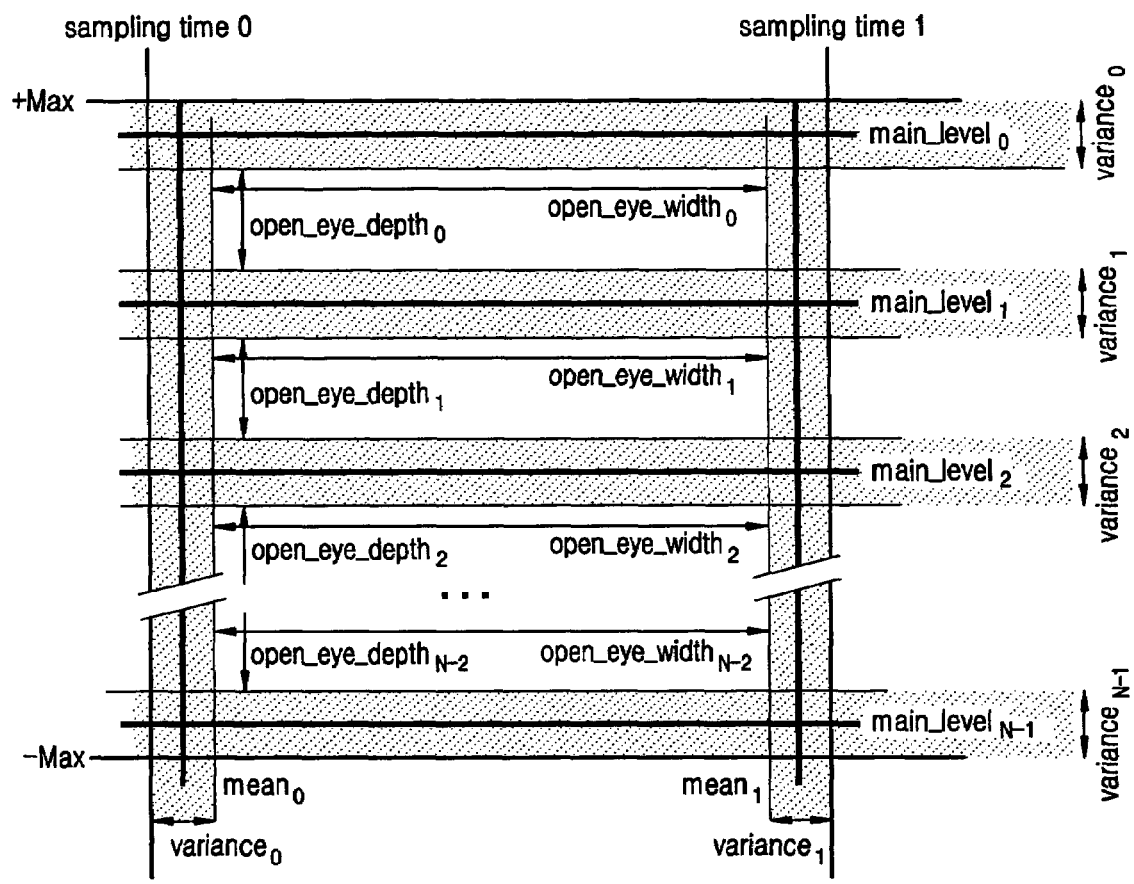
FIG. 3 is a view illustrating an eye pattern of an output signal of the storage medium system.

FIG. 3 is a view illustrating an eye pattern of a general output signal of a conventional storage medium system. The output signal of the storage medium system has N levels indicated as $\text{main\_level}_0$ through $\text{main\_level}_{N-1}$. Each of the N levels is a main level value of the Viterbi detector, that is, a PRML system. The oblique regions in FIG. 3 are the signal-existing regions which are concentrated near the level values or the sampling time. The horizontal and vertical bars correspond to the oblique regions concentrated near the level values and the sampling time, respectively. The openings enclosed by the horizontal and vertical bars are the aforementioned "eyes" of the signal. The vertical and horizontal lengths of each eye are defined as the eye depth and eye width, respectively. If a number of levels of a signal is N, a number of eyes of the signal is N-1.

The present invention uses the eye depth, the eye width, or a combination thereof as a criterion for estimating signal quality. A method of measuring signal quality and an apparatus an apparatus for measuring signal quality using an eye depth, according to the present invention, will be described with reference to FIGS. 4 through 8.

According to the present invention, eye width, eye depth and signal quality are determined by electronic processing of the eye pattern signals to obtain a quantitative value rather than by visually determining signal quality by observation of the eye pattern signals displayed on an oscilloscope.

Figure 4:
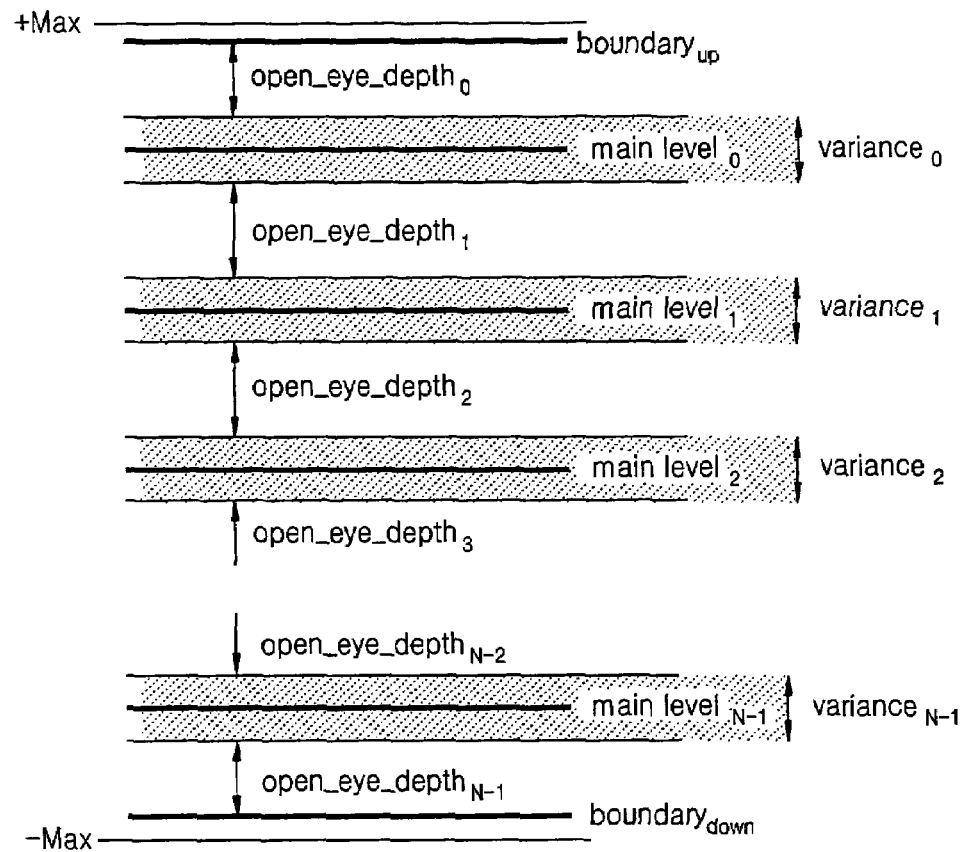
FIG. 4 is an eye diagram illustrating a method of measuring signal quality by using an eye depth, according to an embodiment of the present invention.

FIG. 4 is a diagram illustrating a method of measuring signal quality by using an eye depth, according to an embodiment of the present invention.

According to a qualitative characteristic of the eye pattern, the eye depth represents a degree of deviation of an output signal level from a given level. Therefore, the quantitative definition of the eye depth is useable as a criterion for estimating signal quality. In FIG. 4, the eye pattern which defines the eye width (vertical bars) is omitted, and only the eye pattern which defines the eye depth (horizontal bars) is illustrated.

In FIG. 4, "+max" and "−max" represent typical maximum and minimum signal levels, respectively, of the output signal of a Viterbi detector. The main levels $\text{main\_level}_0$ to $\text{main\_level}_{N-1}$ represent values which are estimated as main level values of the Viterbi detector. The vertical lengths of the oblique bars represent variances which correspond to degrees of signal level distribution of signals near the main level values. The upper and lower limit values $\text{boundary}_{up}$ and $\text{boundry}_{down}$ represent maximum and minimum level values, respectively, of real signals. The upper and lower limit values $\text{boundary}_{up}$ and $\text{boundry}_{down}$ may be set by a user or in accordance with other criteria. As described above, the eye depth is the vertical length of the region where there is no signal near each level value.

According to the eye depth characteristics of the eye pattern, the signal quality is better as the eye depth is deeper. In addition, as the signal levels are further concentrated on the corresponding main level value, the signal quality is better. Therefore, the signal quality is determined to be better as the variance is smaller. The signal quality may be defined in various manners in different embodiments.

Figure 5:
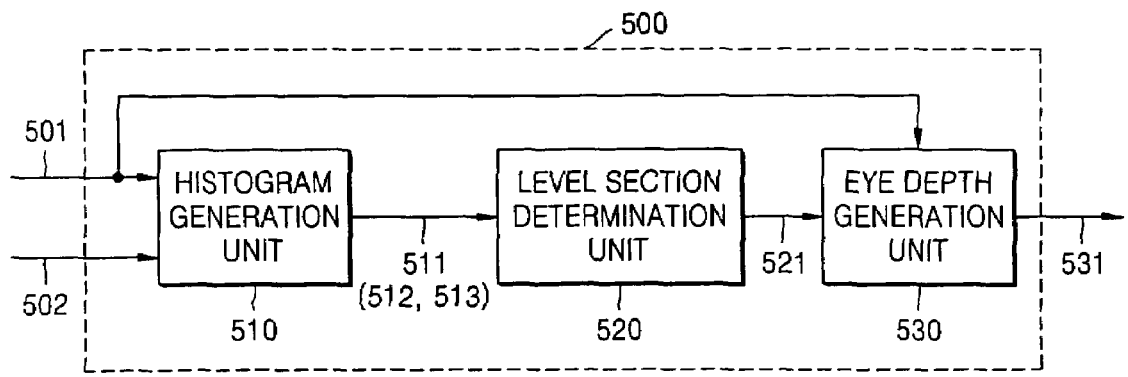
FIG. 5 is a block diagram of a signal quality measuring apparatus according to an embodiment of the present invention.
Figure 6:
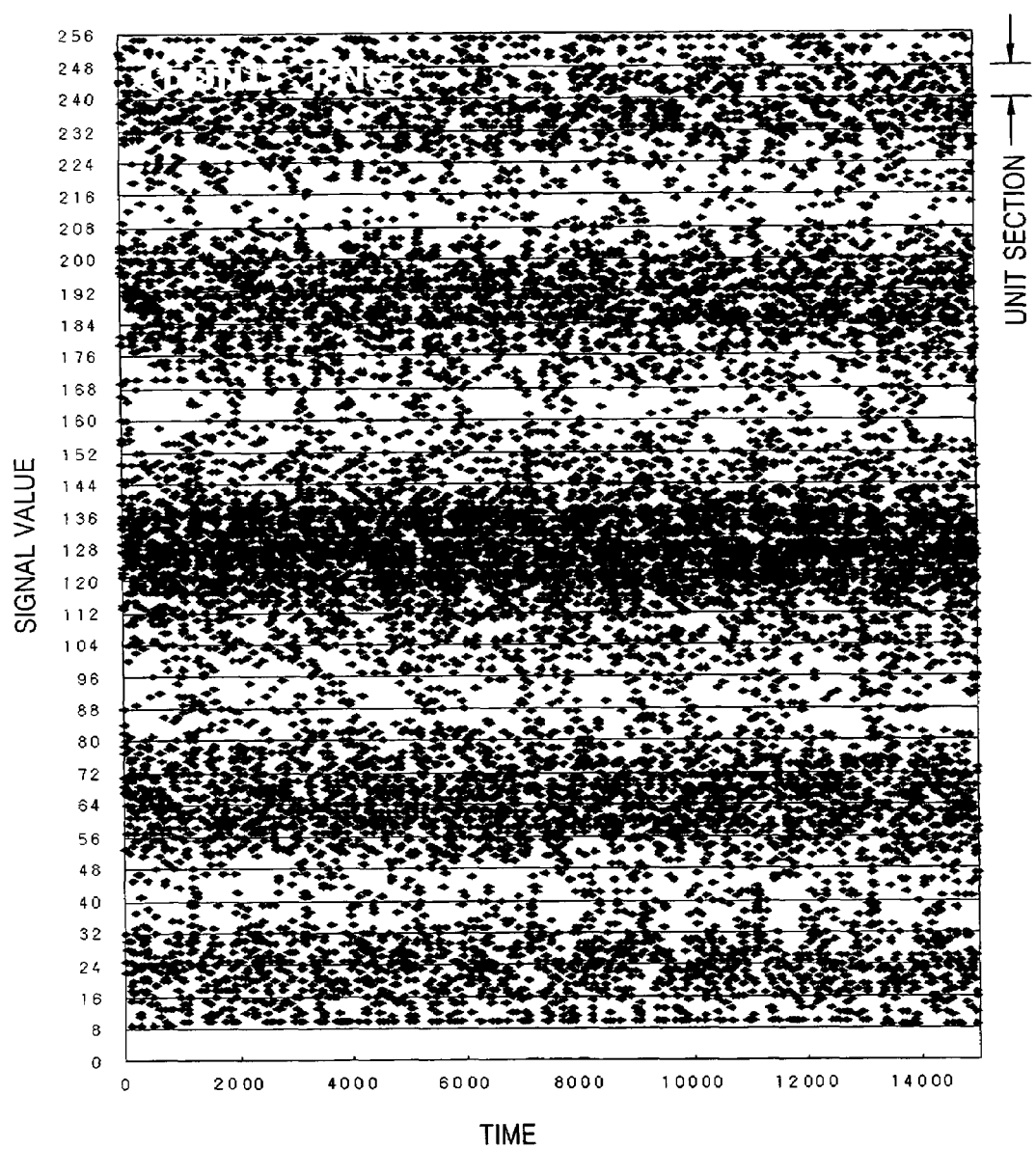
FIG. 6 is view illustrating an exemplary eye pattern of signals measured in a storage medium system using the apparatus of FIG. 5.
Figure 7:
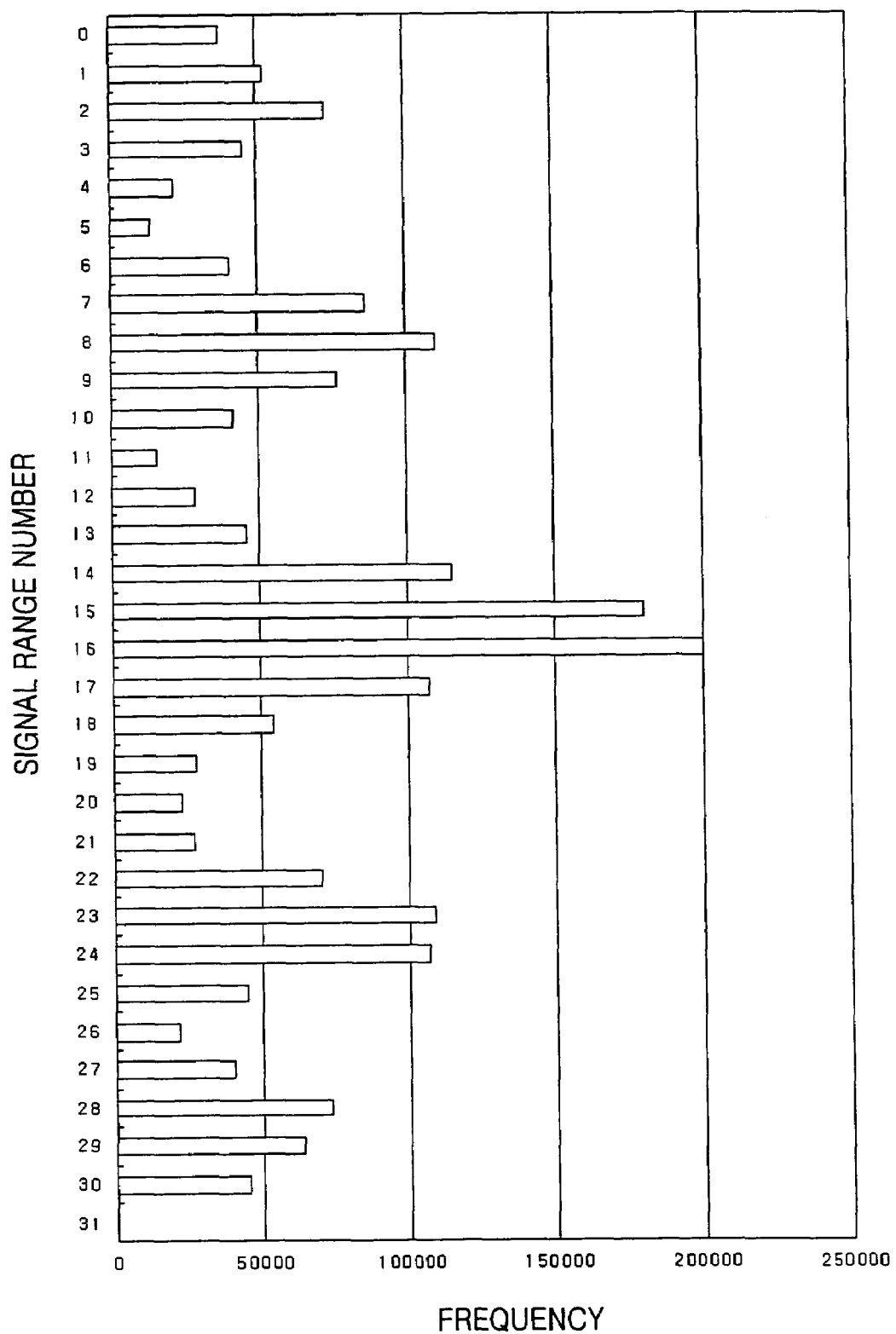
FIG. 7 is a histogram generated from the measured signals of FIG. 6.

FIG. 5 is a block diagram of a signal quality measuring apparatus according to an embodiment of the present invention. FIG. 6 illustrates the eye pattern of the measured signals 501. FIG. 7 is the histogram 511 generated from the measured signals 501 shown as an eye pattern in FIG. 6.

The signal quality measuring apparatus 500 comprises a histogram generation unit 510, a level section determination unit 520, and an eye depth generation unit 530. Measured signals 501 of a storage medium system, which are output signals read out from a storage medium, are input to the signal quality measuring determination unit 500. As described above, each measured signal may be an input signal of an equalizer or a Viterbi detector.

The histogram generation unit 510 receives the measured signals 501 and a unit section size 502 and generates data for a histogram 511 of the measured signals 501. The measured signals 501 are input as an eye pattern to the histogram generation unit 510. The eye pattern has information on the level of the measured signals 501 at a particular time and is divided into unit sections. The histogram 511 illustrates a number of the measured signals 501 existing in unit sections of the eye pattern.

In FIG. 6, the horizontal and vertical axes represent sampling time and signal levels of the measured signals 501, respectively. The measured signals 501 are distributed near the level values in accordance with the characteristics of the general storage medium system and have horizontal bar shapes. The eye pattern includes information about how many signals having a specific level exist in a specific level section. Herein, the specific level sections are identified with the levels of the level sections, which are determined in advance by the user. FIG. 7 shows the histogram 511 for more clearly illustrating the information displayed by the eye pattern. In FIG. 7, the horizontal and vertical axes represent the number of signals and the specific sections, respectively. More specifically, the specific sections are identified with unit section serial numbers. The unit section serial numbers are unit level section sizes divided by the total size of the levels where the signals can exist. Referring to FIG. 7, the number of unit sections is 32. There are a greater number of signals in the unit level sections of the unit section serial numbers 2, 8, 16, 23, and 28 than in other unit level sections.

The histogram 511 generated by the histogram generation unit 510 includes first information on unit sections and second information on a number of signals in a corresponding unit section. The first information corresponds to signal level ranges 512 which the respective unit sections represent. The second information corresponds to a number of signals 513 which have values belonging to the corresponding signal level range 512. For example, in the histogram 511, the unit section size 502, the signal level range 512 of the unit section serial number 20, and the number of signals belonging to the section serial number 20 are 0.1V, 2.5-2.6V, and 25000, respectively. The unit section size may also be referred to as an interval of the histogram (e.g., the unit section serial number 20 has an interval of 0.1V). A count of a number of the signals having a value within the signal level range may be referred to as a unit section value or an interval value (e.g. the unit section serial number 20 has a unit section value of 25000).

The level section determination unit 520 analyzes the histogram 511 generated by the histogram generation unit 510 and determines the level section sizes. One level section corresponds to one main level value. In other words, one level section includes a unit section having a maximum number of signals in the histogram 511, i.e., a maximum unit section value. The level section size is the number of the unit sections which the one level section can have. The level section sizes may be different among the level sections. Referring to the histogram 511 of FIG. 7, it is can be seen that the unit section values of the unit section serial numbers 2, 8, 16, 23, and 28 have maximum values, i.e., greater values than unit section values of adjacent serial numbers. Accordingly, the level sections may be determined to include several unit sections at the centers of the unit sections having a maximum number of signals. In this case, a process of determining how many unit sections are included in a level section is the process of determining the level section size.

Figure 8:
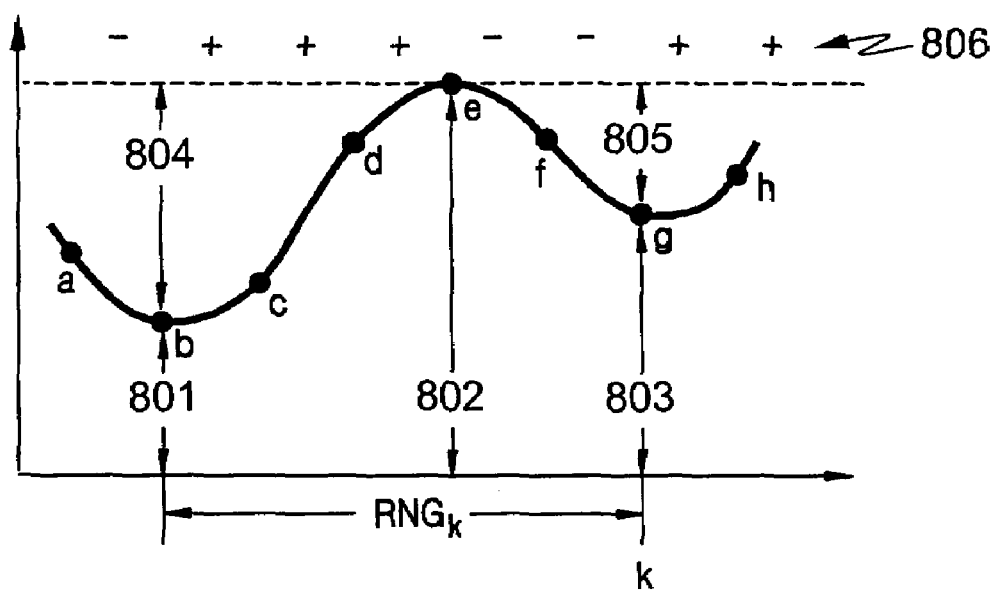
FIG. 8 is a view illustrating a method of determining a level section.

FIG. 8 is a view illustrating a method of determining a level section.

In FIG. 8 a histogram is represented as a continuous wave form. The horizontal and vertical axes represent unit sections and number of signals in the unit sections (unit section values), respectively. In FIG. 8, the unit sections "b" and "g" have first and second minimum values 801 and 803, respectively, and the unit section "e" has a maximum value 802. The maximum value 802 and minimum values 801 and 803, are determined by extracting slopes of the continuous waveform at the unit section values. A respective minimum value is determined at a point where the slope of the continuous waveform changes from a negative to a positive value. A respective maximum value is determined at a point where the slope of the continuous waveform changes from a positive to a negative value. In FIG. 8, polarities of slopes of between values of adjacent unit sections (a-f) are indicated by a sequence of positive (+) and negative (−) signs identified collectively with reference numeral 806.

In an example, a minimal section having minimum-maximum-minimum value sections may be determined as one level section. In the histogram of FIG. 8, the level section size $RNG_k$ is 5, where, k represents a level section index for identifying a level section.

In another example, a minimal section having minimum-maximum-minimum value sections and both differences 804 and 805 between the maximum value ($V_{max}$) and the minimum value ($V_{min}$) above a predetermined threshold value may be determined as one level section. The predetermined threshold value may be represented by: "(Vmax)×C1," where C1 is a first threshold constant having a value of 0 to 1. Additional conditions are represented by expression (1).

$$\text{Difference between } V_{max} \text{ and } V_{min} > (V_{max}) \times C1 \quad (1)$$

The additional conditions in the level section determination are to correct an error which may occur in the level section determination by measuring only the slope change.

In still another example, a minimal section having minimum-maximum-minimum value sections and an extracted slope above a predetermined threshold value may be determined as one level section. The predetermined threshold value may be represented by a second threshold constant C2.

Referring again to FIG. 5, the eye depth generation unit 530 receives the measured signal 501 and the level section size 521 and generates signal quality Q. The signal quality Q may be qualitatively defined using Equation (2) in accordance with a geometrical shape of the eye depth of the eye pattern.

$$Q_{d1} = \sum_{i=0}^{N-1} D_i \quad (2)$$

where, $Q_{d1}$ represents the signal quality, and $D_i$ represents the eye depth of the i-th level section.

The eye depth of a typical level section may be quantitatively represented in consideration of the average or the dispersion of the signal levels. In this case, the signal quality Q is defined by Equation (3).

$$Q_{d2} = (M_0 - v_0/2) - (M_{N-1} - v_{N-1}/2) - \sum_{i=0}^{N-2} v_i \quad (3)$$

where, N is a number of main levels, and $M_i$ and $v_i$ are an average value and a variance value of signal levels of the i-th level section, respectively.

In order to calculate the variance value $v_i$, the main level value is defined. The main level value may be an average value of the signal levels of the signals belonging to the corresponding level section, a level value of the unit section having the most frequently occurring signals and belonging to the corresponding level section, or a value input by a user.

In an example of the present invention, the variance value $v_i$ is a statistical variance value of signal levels of the signals belonging to a corresponding section. In the example, the reference value is a main level value of each level. In another example of the present invention, the variance value $v_i$ is a statistical value of differences between signal levels of signals belonging to a corresponding level section and a main level value of the corresponding level section.

In addition, if the upper and lower limit values of the real level values are defined and only the signals in the range between the upper and lower limit values are considered, the signal quality may be defined by Equation (4).

$$Q_{d3} = B_{up} - B_{down} - \sum_{i=0}^{N-1} v_i \qquad (4)$$

where, N is the number of main levels, $v_i$ is the variance value of the signal levels of the i-th level section, and $B_{up}$ and $B_{down}$ are upper and lower limit values, respectively. The upper and lower limit values are defined by: using a value input by the user; using the first average and variance values $M_0$ and $v_0$ and the last average and variance values $M_{N-1}$ and $v_{N-1}$; or using a signal level value of a level section which satisfies a least frequent number. An example of the signal quality Q in case of the upper and lower limit values defined by using the first and last average and variance values variance is the same as that of Equation 3.

All the signal qualities $Q_{d1}$, $Q_{d2}$, and $Q_{d3}$ are useable as criteria for estimating signal quality and constitute aspects of the present invention.

Now, a signal quality measuring method and apparatus using an eye width, according to the present invention, will be described with reference to FIGS. 9 through 11.

Figure 9:
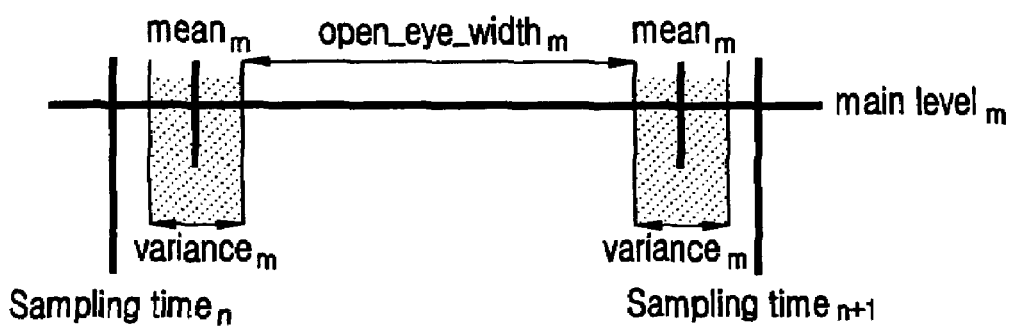
FIG. 9 is an eye diagram illustrating a method of measuring signal quality by using an eye width, according to another embodiment of the present invention.

FIG. 9 is a diagram illustrating a method of measuring eye width, according to another embodiment of the present invention.

The eye width represents information about how accurately the measured signal is sampled. Therefore, a quantitative definition of the eye width is also useable as a criterion for estimating signal quality. In FIG. 9, the eye pattern of the eye depth is omitted, and only the eye pattern of the eye width is illustrated.

In FIG. 9, "sampling time$_n$" and "sampling time$_{n+1}$" represent the n-th and (n+1)-th sampling time, and "mean$_m$" and "variance$_m$" represent the average and variance values of shifted distances (delta) of a measured signal with reference to m-th main level value. Herein, the delta value is a criterion of how far the measured signal is shifted with reference to each main level value on the time axis. The delta value may be defined in various manners. As described above, the eye width open_eye_width$_m$ is the horizontal length of the region where there is no signal near the m-th main level value.

According the eye width characteristic of the eye pattern, the signal quality is better as the eye width is wider. In other words, as signals at different levels are further concentrated on the corresponding sampling time the signal quality is better. Therefore, the signal quality is determined to be better as the delta value is smaller. In addition, as the delta values are concentrated on the sampling time of any one side the signal quality is better. As the variance value is smaller, the signal quality is determined to be better.

Figure 10:
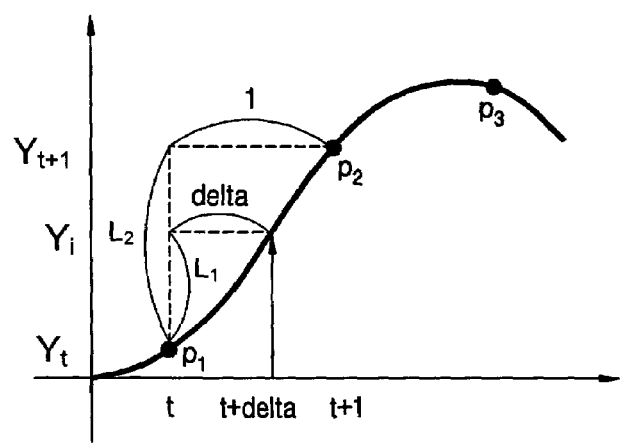
FIG. 10 is a view for explaining a delta value.

FIG. 10 is a view for explaining a delta value.

In an example of the present invention, the quantitative characteristic of the eye width may be defined by using the average and variance values of the delta values. In FIG. 10, the horizontal axis is a time axis representing sampling time and the vertical axis represents signal level. Signal points $p_1$, $p_2$ and $p_3$ are points represented on the graph when the specified signal is shifted from a position at time t to another position at time t+1.

According to the present invention, the delta value may be defined as a time transition period between two signal points that intersect each main level value. As shown in FIG. 10, a shift from the point $p_1$ to the point $p_2$ is involved in the intersection of the main level value $Y_i$. From a geometrical relation of a right triangle, shown in FIG. 10, and including points $p_1$ and $p_2$ along the hypotenuse of the triangle and an adjacent side having a value of 1, the delta value may be defined by Equation (5).

$$\text{delta} = L_1/L_2 = (Y_i - Y_t)/(Y_{t+1} - Y_t)$$

where, $Y_i$ represents the main level value of the i-th level section, and $Y_t$ and $Y_{t+1}$ represent the measured signal levels at the times t and t+1, respectively.

Figure 11:
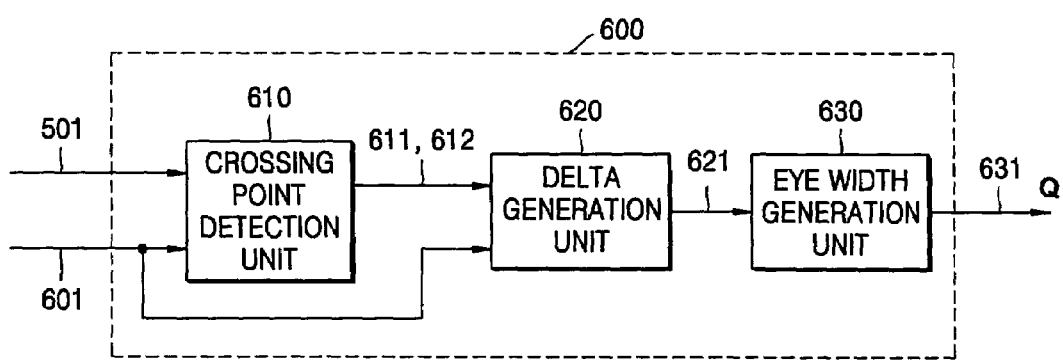
FIG. 11 is a block diagram of a signal quality measuring apparatus according to the another embodiment of the present invention.

FIG. 11 is a block diagram of a signal quality measuring apparatus according to another embodiment of the present invention.

The signal quality measuring apparatus 600 comprises a crossing point detection unit 610, a delta generation unit 620, and an eye width generation unit 630.

The crossing point detection unit 610 receives a measured signal 501 and a main level value 601 and detects two signal points $p_1$ and $p_2$ that intersect the given main level value $Y_i$. The sampling times t and t+1 and the corresponding signal levels $Y_t$ and $Y_{t+1}$ (611 and 612) are extracted at the signal points $p_1$ and $p_2$. The main level value $Y_i$ (601) may be a value designated by the user or a main level value generated by the signal quality measuring apparatus using the eye depth.

The delta generation unit 620 receives the signal levels 611 and 612 and the main level values 601 at the respective sampling time and generates delta values 621 by using Equation 5.

The eye width generation unit 630 receives the delta values 621 and generates signal quality $Q_w$ (631). The eye width signal quality $Q_w$ is defined using Equation (6) in accordance with a qualitative characteristic of the eye width.

$$Q_{w1} = \sum_{i=0}^{N-1} W_i \qquad (6)$$

where, $W_i$ represents the eye width of the i-th level section.

In the embodiment of the present invention, the signal quality may be quantitatively defined using Equation (7) by using the aforementioned delta values.

$$Q_{w2} = 1 - 0.5 \sum_{i=0}^{N-1} (Mt_i + 0.5 vt_i) \qquad (7)$$

where, $Mt_i$ and $vt_i$ represent the average value and the variance value of the delta values of the i-th level section, respectively.

The signal quality measuring method and apparatus using the eye width have a feature that the crossing points of the main level values in all the level sections are analyzed along with the time axis. The method of the present invention is different from the conventional jitter value measuring method where the time analysis is carried out at only the zero-crossing points. In the present invention, the sampling points (sampling accuracy) and dispersion (sampling precision) are measured by using information at all the level crossing points, so that signal quality may be measured more accurately.

A signal quality measuring method and apparatus using both eye depth and eye width, according to the present invention, will be described with reference to FIGS. 12 to 15.

Figure 12:
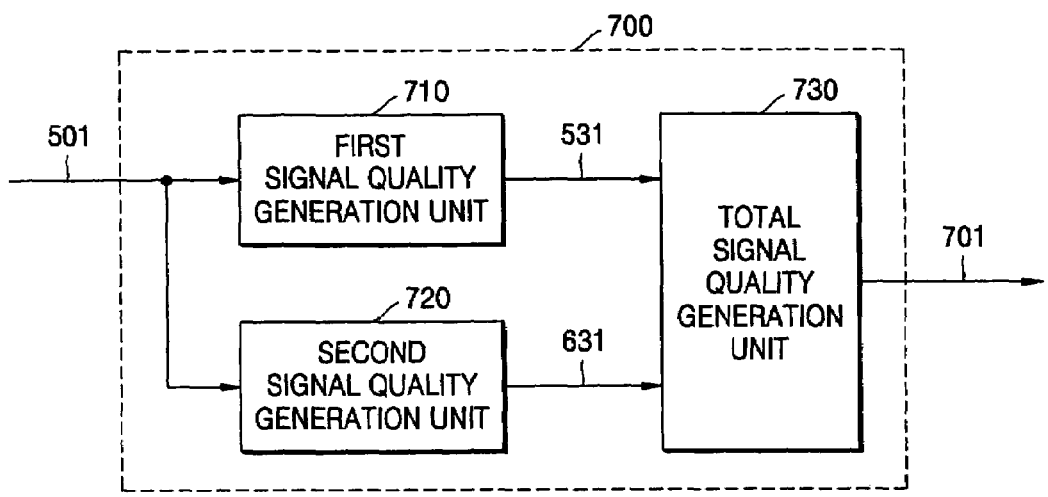
FIG. 12 is a block diagram of a signal quality measuring apparatus according to still another embodiment of the present invention.

FIG. 12 is a block diagram of a signal quality measuring apparatus according to still another embodiment of the present invention. The signal quality measuring apparatus 700 comprises first and second signal quality generation units 710 and 720 and a total signal quality generation unit 730.

The first signal quality generation unit 710 receives a measured signal 501 and generates an eye depth signal quality $Q_d$. The second signal quality generation unit 720 receives the measured signal 501 and generates an eye width signal quality $Q_w$. The first signal quality generation unit 710 has the same structure as that of the signal quality measuring apparatus 500 shown in FIG. 5. The second signal quality generation unit 720 has the same structure as that of the signal quality measuring apparatus 600 shown in FIG. 11.

The total signal quality generation unit 730 receives the eye depth and eye width signal qualities $Q_d$ and $Q_w$ (531 and 631) and generates a total signal quality $Q_T$ (701). The total signal quality 701 may be generated by using first, second and third methods further described below.

In the first method, all eyes are considered to form one rectangle and the total signal quality $Q_T$ is defined by Equation (8).

$$Q_T = \left(\sum_{i=0}^{N-1} D_i\right) \times \left(\sum_{i=0}^{N-1} W_i\right) = Q_d \times Q_w \qquad (8)$$

where, $Q_d$ and $Q_w$ represent the eye depth and eye width signal qualities, respectively.

In the second method, each eye is considered to be a rectangle and the total signal quality $Q_T$ is defined by Equation (9).

$$Q_T = \sum_{i=0}^{N-1} (D_i \times W_i) \qquad (9)$$

In the third method, each eye is considered to be a trapezoid and the total signal quality $Q_T$ is defined by equation (10).

$$Q_T = \sum_{i=0}^{N-2} \{0.5(W_i + W_{i+1}) \times D_i\} \qquad (10)$$

Figure 13:
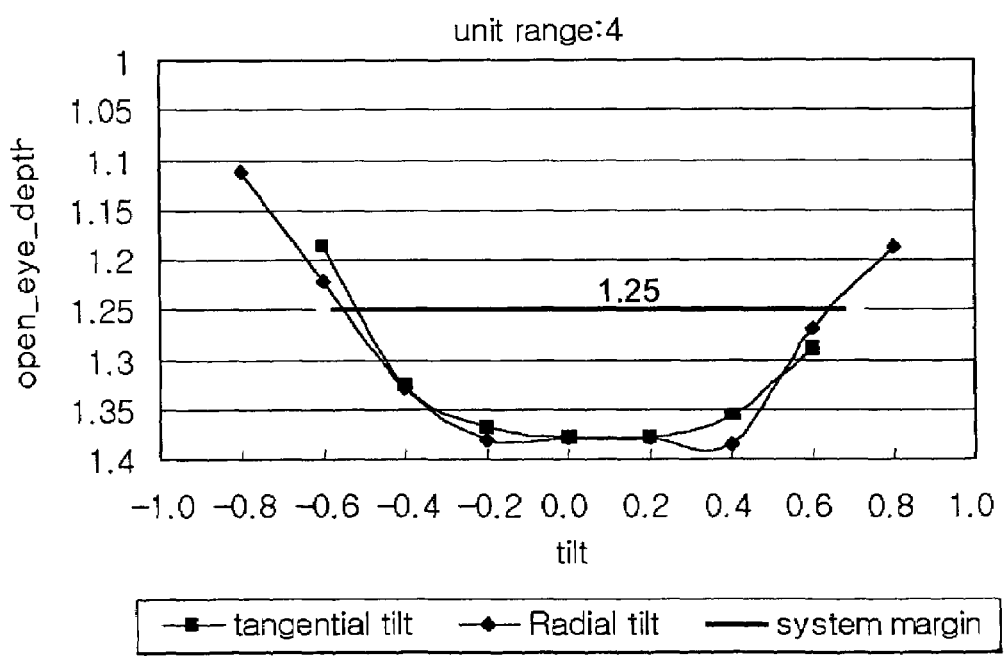
FIGS. 13 through 15 are views illustrating signal qualities measured in the embodiments of the present invention.
Figure 14:
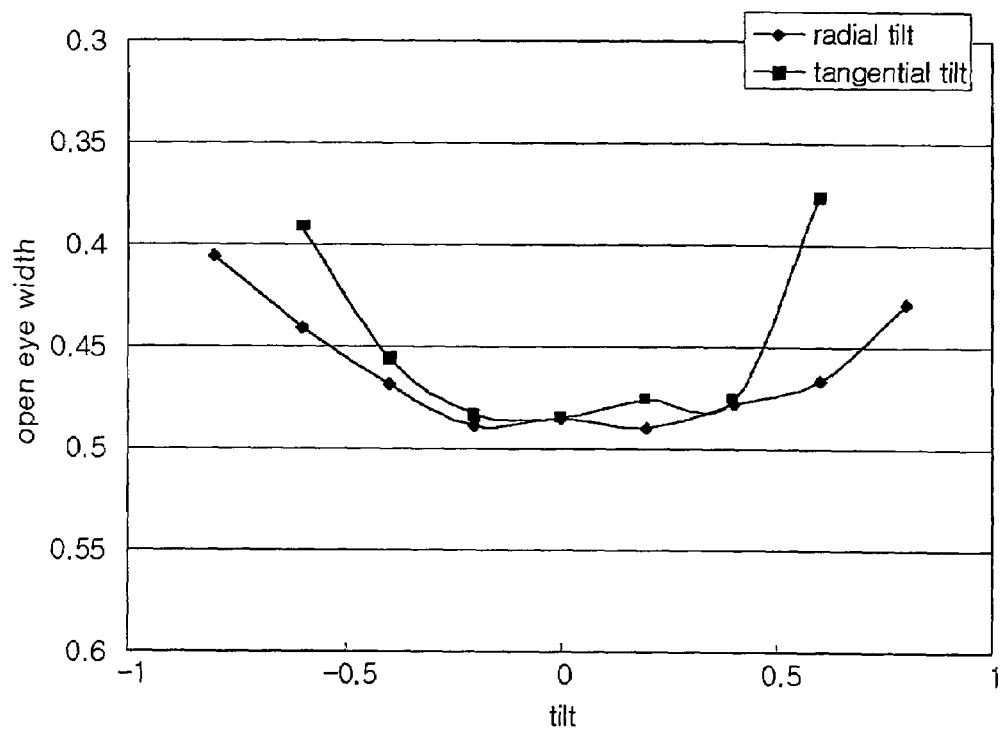
Figure 15:
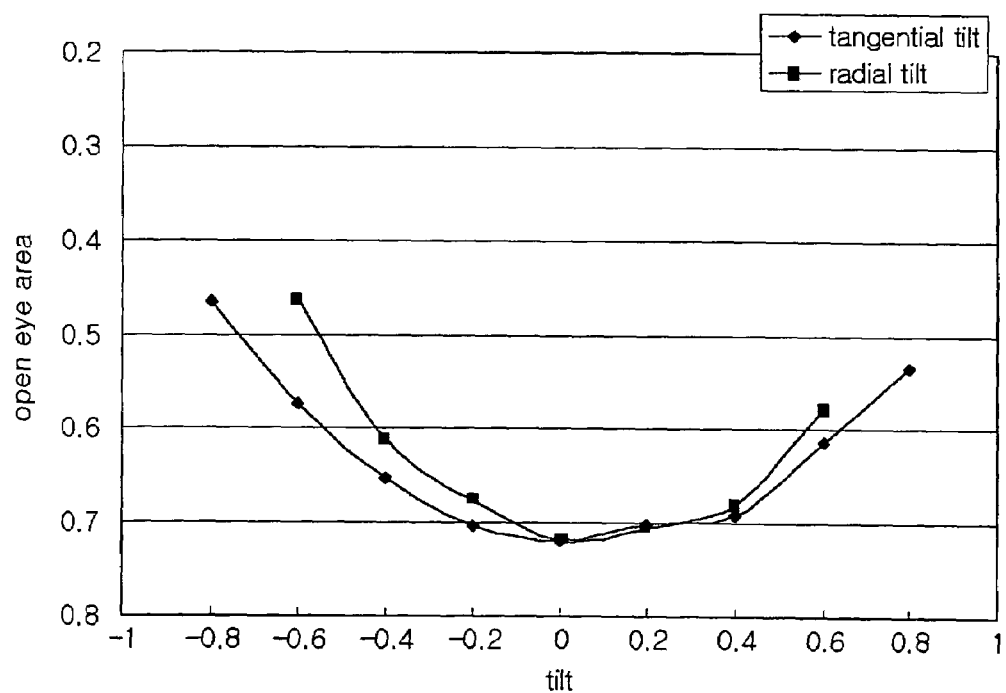

FIGS. 13 through 15 are views illustrating signal qualities measured in the embodiments of the present invention. The signal quality measurement is carried out under the same conditions used for obtaining the results shown in FIGS. 1 and 2. In addition, the input signal of an equalizer is used as the measured signal.

Figure 2:
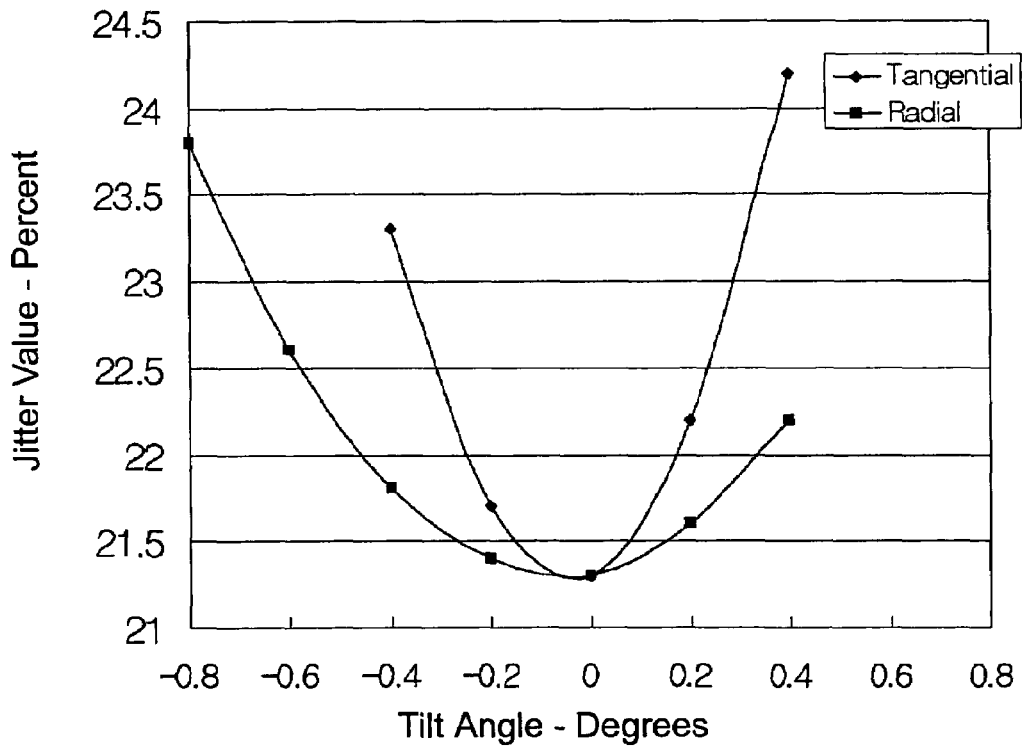
FIG. 2 is a view illustrating signal quality results obtained by jitter value detection of the storage medium system.

FIG. 13 corresponds to a case where a bit error rate (BER) is estimated by using only the eye depth of the eye pattern. In this case, the BER is measurable at a degree of 0.6 or more and at a degree of −0.6 or less rather than over a lesser range as shown in FIG. 2. Since the region beyond the system margin of 1.25 starts from a degree of −0.6 or less, the allowable tilt can be measured as a degree of about −0.5 as show in FIG. 13. However, the allowable tilt is not measurable by the conventional methods.

FIG. 14 corresponds to a case where a BER is estimated by using only the eye width of the eye pattern. As shown in FIG. 14 and contrary to the conventional methods, the signal quality characteristics are detectable.

FIG. 15 corresponds to a case where a BER is estimated by using both eye width and eye depth of the eye pattern. In this case, the signal quality can be clearly detected in a wider range than the case of FIG. 2.

As described above, according to the signal quality measuring method and apparatus of the present invention, it is advantageously possible to accurately measure the signal quality in a high-density storage medium system or communication system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for measuring a quality of a signal passing through a channel, the apparatus comprising:
    an eye pattern detection unit, which detects eye pattern signals representing time changes of a waveform of the signal passing through the channel; and
    a signal quality generation unit, which generates a signal quality value of the signal passing through the channel based on an eye depth measured from the eye pattern signals, wherein the signal quality generation unit comprises:
        a histogram generation unit which generates a histogram of the eye pattern signals;
        a level section determination unit which determines a number of level sections, a size of each level section and a corresponding main level value for each level section based on the histogram; and
        an eye depth generation unit, which generates the eye depth for each determined level section,
        wherein the histogram generation unit obtains unit sections having a maximum or a minimum unit section value based on the histogram, and
        wherein, if an absolute value of a difference between adjacent minimum and maximum unit section values is smaller than a predetermined threshold value, the level section determination unit excludes the unit section having the smaller difference value as one of the boundary unit sections for the level section.

2. The apparatus according to claim 1, wherein the histogram generation unit divides the histogram into unit sections each unit section having a predetermined size, and counts a number of the eye pattern signals belonging to each unit section, so as to obtain a unit section value for each unit section.

3. The apparatus according to claim 2, wherein the level section determination unit extracts the unit sections having the maximum or the minimum unit section value, and determines one level section as including one unit section having one of the maximum unit section values bounded by first and second unit sections each having one of the minimum unit section values.

4. The apparatus according to claim 3, wherein the level section determination unit determines the unit sections having the maximum and minimum unit section values by measuring slopes of a curve fitted to the unit section values.

5. The apparatus according to claim 4, wherein, if the slope of the curve at a unit section value is smaller than a predetermined threshold value, the level section determination unit excludes the unit section having the smaller slope from the level section.

6. The apparatus according to claim 1, wherein the predetermined threshold value is a largest unit section value of the histogram multiplied by a threshold constant having a value in a range between 0 and 1.

7. The apparatus according to claim 1, wherein the eye depth generation unit generates the eye depth based on levels and distribution states of the eye pattern signals belonging to the respective level sections.

8. The apparatus according to claim 7, wherein the distribution states are generated based on the main level values of the level sections.

9. The apparatus according to claim 8, wherein each main level value is one of an average value of the levels of the eye pattern signals in the corresponding level section, a value corresponding to a unit section having a highest count of the eye pattern signals belonging to the corresponding level section, and a value input by a user.

10. The apparatus according to claim 9, wherein the distribution states are statistical variance values calculated with reference to the main level values.

11. The apparatus according to claim 9, wherein the distribution states are generated based on differences between a respective one of the main level values and the levels of the eye pattern signals belonging to the corresponding level section.

12. The apparatus according to claim 7, wherein a signal quality (Q) of the eye depth of the corresponding level section is generated by an equation:

$$Q = (M_0 - v_0/2) - (M_{N-1} - v_{N-1}/2) - \sum_{i=0}^{N-2} v_i,$$

where N represents a number of the main levels, M represents an average value of the eye pattern signals, and $v_i$ represents a variance value of the eye pattern signals in the i-th level section, respectively.

13. The apparatus according to claim 7, wherein signal quality (Q) of the eye depth of the corresponding level section is generated by an equation:

$$Q = B_{up} - B_{down} - \sum_{i=0}^{N-1} v_i, \text{ and}$$

wherein N represents a number of the main levels, $v_i$ represents a variance value of the signals in the i-th level, section, $B_{up}$ represents an upper limit value of the level section, and $B_{down}$ represents a lower limit value of the level section, respectively.

14. The apparatus according to claim 13, wherein the upper and lower limit values of the level section are one of a value input by a user and respective unit level value of the level section having a minimum frequency.

15. The apparatus according to claim 1, wherein the channel is one of a channel of a communication system and a channel of a storage medium system.

16. The apparatus according to claim 15, wherein, where the channel is the channel of the storage medium system, the signal passing through the channel is one of an input signal of an equalizer and an input signal of a Viterbi detector.

17. A method of measuring a quality of a signal passing through a channel, the method comprising:
detecting eye pattern signals representing time changes of a waveform of the signal passing through the channel; and
generating a signal quality based on an eye depth measured from the eye pattern signals, wherein the generating of the signal quality comprises:
generating a histogram of the eye pattern signals;
determining a size of each of a plurality of level sections to include a corresponding main level value based on the histogram;
generating the eye depth for each respective determined level section based on the respective level size and the eye pattern signals,
wherein a signal quality (Q) of the eye depth is generated by an equation:

$$Q = (M_0 - v_0/2) - (M_{N-1} - v_{N-1}/2) - \sum_{i=0}^{N-2} v_i,$$

where N represents a number of the main levels, M represents an average value of levels of the eye pattern signals in an i-th level section, and $v_i$ represents a variance value of the eye pattern signals in the i-th level section, respectively.

18. The method according to claim 17, wherein the determining of the size of each of the plurality of level sections comprises:
extracting unit sections having a maximum or a minimum number of signals; and
determining a level section as including one unit section having the maximum value bordered by unit sections having the minimum value.

19. The method according to claim 17, wherein the generating of the eye depth comprises:
determining levels and distribution states of the eye pattern signals belonging to the level sections.

20. The method according to claim 19, wherein the distribution states are generated based on the main level values of the level sections.

21. The method according to claim 20, wherein the distribution states are statistical variance values, which are calculated with reference to the main level values.

22. The method according to claim 20, wherein the distribution states are generated based on differences between the main level values and the levels of the eye pattern signals belonging to the corresponding level section.

23. The method according to claim 19, wherein the signal quality (Q) of the eve depth is further generated by an equation:

$$Q = B_{up} - B_{down} - \sum_{i=0}^{N-1} v_i,$$

where N represents a number of the main levels, $v_i$ represents a variance value of the eye pattern signals in an i-th level section, $B_{up}$ represents an upper limit value of the i-th level, and $B_{down}$ represents a lower limit value of the i-th level, respectively.

* * * * *

UNITED STATES PATENT AND TRADEMARK OFFICE
CERTIFICATE OF CORRECTION

| | | |
|---|---|---|
| PATENT NO. | : 7,324,903 B2 | Page 1 of 1 |
| APPLICATION NO. | : 10/919531 | |
| DATED | : January 29, 2008 | |
| INVENTOR(S) | : Eing-seob Cho et al. | |

It is certified that error appears in the above-identified patent and that said Letters Patent is hereby corrected as shown below:

Column 13, line 32, change "eve" to --eye--.

Column 13, line 42, insert --a-- before "signal".

Column 13, line 53, change "eve" to --eye--.

Signed and Sealed this

Tenth Day of June, 2008

JON W. DUDAS
*Director of the United States Patent and Trademark Office*